United States Patent

Stoy et al.

[11] 3,965,227
[45] June 22, 1976

[54] METHOD OF SIMULTANEOUSLY MANUFACTURING ACRYLIC FIBERS AND NITRATES

[75] Inventors: Artur Stoy; Vladimir Stoy; Renata Urbanova; Jaroslav Prokop, all of Prague; Josef Kucera, Pardubice, all of Czechoslovakia

[73] Assignee: Ceskoslovenska akademie ved, Prague, Czechoslovakia

[22] Filed: Oct. 2, 1974

[21] Appl. No.: 511,427

Related U.S. Application Data

[63] Continuation of Ser. No. 264,451, June 20, 1972, abandoned.

[30] Foreign Application Priority Data

June 22, 1971   Czechoslovakia ............... 4609-71

[52] U.S. Cl. ........................ 264/38; 260/29.6 AN; 264/182
[51] Int. Cl.² .............................................. D01F 13/00
[58] Field of Search ........................... 264/182, 38; 260/29.6 AN

[56] References Cited
UNITED STATES PATENTS

| | | | |
|---|---|---|---|
| 2,254,237 | 9/1971 | Nash .................................. | 264/188 |
| 2,579,451 | 12/1951 | Polson ............................... | 264/182 |
| 2,625,461 | 1/1953 | Richter et al. .................... | 264/188 |
| 3,107,971 | 10/1963 | Yasawa et al. .................... | 264/182 |
| 3,235,642 | 2/1966 | Blamberg ......................... | 264/184 |

*Primary Examiner*—Jay H. Woo
*Attorney, Agent, or Firm*—Murray Schaffer

[57] ABSTRACT

Solutions of polymers or copolymers containing up to 100% of acrylonitrile units and from 0 to 50 mol percent of units of one or more comonomers copolymerizable with acrylonitrile into nitric acid-soluble polymers is wet spun in a coagulating bath containing a constant surplus of neutralizing agents in an amount ranging from about 0.05 to about 5% by weight which neutralizing agents are sufficient to convert the nitric acid into nitrates and to make the filaments leaving the coagulating bath free of nitric acid. The coagulating bath is maintained at a temperature at least about 5° C above the temperature at which the solution of the same concentration is saturated with respect to its nitrate content. The concentration of the coagulating bath is kept constant during the wet spinning by withdrawing a part of the bath equimolar to the amount of nitric acid introduced therein by the wet spinning, adding a neutralizing agent to the bath at a rate at which the nitric acid is introduced into the bath and replacing the water lost from the bath during the withdrawing of the portion thereof. The filament fibers are concommitantly formed by washing, stretching, heat stabilizing and drying the material as it leaves the bath, together with the formation of nitrates by treating the withdrawn portion of the bath in conventional manner to recover in solid form the nitrates found in the withdrawn bath.

10 Claims, 1 Drawing Figure

METHOD OF SIMULTANEOUSLY MANUFACTURING ACRYLIC FIBERS AND NITRATES

RELATED APPLICATION

The present application is a continuation of copending application Ser. No. 264,451 filed June 20, 1972 now abandoned entitled METHOD OF MANUFACTURING ACRYLIC FIBRES. Reference to the foregoing application can be made as if the same were more fully set forth herein.

BACKGROUND OF THE INVENTION

The present application relates to the formation of acrylic fibres by wet spinning polymeric solutions in a nitric acid coagulation bath and simultaneously recovering from the coagulating bath the nitrates produced during the wet spinning.

It is known that nitric acid is a good solvent for polyacrylonitrile and copolymers of acrylonitrile. Aqueous solutions of between 65 to 72 percent ic nitric acid dissolve acrylic polymers at temperatures between zero and 20° C. The solutions thus obtained are spun into a more diluted nitric acid solution,, e.g. 40% by weight. Acrylonitrile polymers cannot be spun into plain water or a less dilute nitric acid solution because the fibres thus produced would be non-homogeneous, weak and could not be easily stretched. Moreover, dilute nitric acid solutions would be disadvantageous from an economical standpoint with respect to the recovery of the acid. Therefore, the concentration of nitric acid in the coagulating bath is usually kept at about 40% and the acid is recovered by distillation and reused thereafter. The wash is carried out in counterflow, in the usual way, but it is impossible to recover all nitric acid because the volume of the dilute wash water is too large. Wash water is generally neutralized and drained off to sewage. This is a very serious problem with respect to current water polution restrictions.

The recovery of nitric acid in the form of nitrates by neutralizing the coagulating bath containing 40% to 45% nitric acid, is not economical either, because of the large quantities of water to be evaporated. To recover nitric acid from large quantities of dilute waste water is practically impossible. On the other hand, the market for nitrates in the fertilizer industry is broad so that their recovery at reasonable costs would be desirable.

It has been established that in wet spinning processes as well as in such analogous manufacturing processes as in the formation of foils, tubings and similar conversion of acrylic polymers and copolymers into solid form, the coagulation is, in principal always heterogeneous. At first, a more or less thin homogeneous coagulated membrane ("skin") is formed. The thickness of this skin depends upon the kind of polymer, the solvent, the temperature and other factors such as the bath length, the velocity of the withdrawal of the formed polymer, as well as the agitation of the bath and other physical factors. After the formation of the skin, the molecules of the solvent in the polymeric solution penetrate from the interior of the fibre or the like through the outer membranous skin into the spinning coagulating bath. The molecules of the coagulating agent (usually water) diffuse in opposite directions into the fibre. Where acrylonitrile polymers and copolymers are dissolved in nitric acid solutions, the water molecules penetrate through the membranous skin at a considerably higher rate than the nitric acid molecules and ions diffuse outwardly. Thereby an undesirable osmotic pressure is created, leading to the non-homogeneous formation of the fibre. Water penetration through the surface membrane dilutes the nitric acid solution and coagulates the polymer, forming in addition locally thin membranes which burst by the osmotic pressure of the water. This is repeated until the coagulation is finished, leaving the interior of the fibre full of microscopic voids filled with water. Such fibres are weak, brittle and cannot be stretched.

Nevertheless homogeneous, stretchable fibres can also be obtained, but only if the thickness of the surface membrane is at least half of that of the fibre diameter.

It has been further established that such thick membranes are obtained only if the diffusion rate of the coagulating agent is not substantially greater than that of the solvent. Up to now, this problem was solved in various ways considered broadly as methods of decreasing the coagulation rate of the spinning solution. The rate of coagulation was decreased either by decreasing the temperature of the spinning bath below plus 2° C or by maintaining a rather high concentration of solvent in the bath. Still another method used was a two step coagulation procedure. The intermediate fibre produced was a rubbery plasticized fibre containing a certain amount of solvent which was then washed out from the elastically stretched polymer. The first mentioned method was first obtained by the Dow Chemical Company in spinning zinc chloride solutions of polyacrylonitrile, but the same method can be used also for other solvents. In all of the above mentioned methods the principle is basically the same: to decrease the activity of water toward the polymer solution.

It had also been proposed to use copolymers of acrylonitrile with hydrophilic comonomers such as acrylamide so that water enters into the fibre being formed and acts as a plasticizer. Furthermore it was also known that even non solvents for acrylic polymers, such as various salts, can reduce the coagulation activity of the bath so as to obtain translucent strong gels. On the other hand it was known that strong bases rapidly hydrolyse the nitrile group into a carboxylic one and moreover, cause rapid discoloration. In the case where nitric acid is used as the solvent for acrylic polymers, bases could not be added to the coagulating liquid since the instantaneous neutralization would cause an extreme increase the coagulation rate and thus cause heterogeneity of the fibre which would be full of microscopic voids.

The present invention is on the other hand based upon the activity of the coagulant, e.g. water, being decreased so that the diffusion of water through the surface membrane into the coagulated stream (fibre) of the polymer solution is not substantially higher than that of the solvent diffusing outwards. In the known processes the activity of water remains high enough to form a gel-like fibre containing more water than the same polymer in a true equilibrium with water. The surplus of water is present as a "false plasticizer", not really solvating the polymer but forming a non-equilibrium mixture in which water fills up rather uniformly the interstices between the chains. Such gel-like fibres are stretchable but their strength is not too high because not only is the concentration of the solvent decreased but so is the concentration of the polymer. When stretched and dried, they cannot be converted again into the original gel state. Even hydrophilic copolymers do not regain their original water content if coagulated in the usual way because said surplus of water, forming the false plasticizer can be introduced only if the coagulation occurs in an excess of water, increasing by its osmotic pressure the volume of the coagulated fibre. The water molecules are pushed between the chains prior to the production of intermolecular bonds.

On the other hand, it is possible to decrease the activity of the water in the coagulating bath to such an extent that is diffusion rate is considerably lower than that of the solvent. This can be obtained when a rather concentrated electrolyte solution, preferably a nitrate solution, is use as a coagulating bath. In a saturated solution the activity of water sinks to zero and therefore the solution should be maintained below the saturation point. In this condition the solvent (nitric acid) penetrates more rapidly outward through the surface membrane than the water would inwardly. As a result the concentration of the polymer in the stream increases during the coagulation and the coagulated fibre contains no excessive water, i.e., no false plasticizer. The fibre is thus stronger and the spinning is not so often interrupted by torn filaments. In spite of the decreased activity of the coagulant, the total rate of coagulaton is maintained high by adding a neutralizing agent to the coagulating liquid during the wet spinning. Small hydrogen ions diffuse very rapidly from the fibre followed by their counter-ions, the $NO_3$.

It is therefore the object of the present invention to provide a new method for manufacturing acrylic fibres and filaments by the wet spinning of nitric acid solutions of acrylic polymers and copolymers into an aqueous coagulating bath wherein a comparatively high concentration of nitrates is constantly maintained and wherein the nitrates are simultaneously recovered during the process.

It is a further object of the present invention to provide a new method for manufacturing acrylic fibres and filaments and the recovery of nitrates overcoming the disadvantages and defects of the prior art methods.

SUMMARY OF THE INVENTION

According to the present invention the foregoing objects, as well as other numerous objects and advantages are obtained in a method wherein a solution of polymers or copolymers containing up to 100% of acrylonitrile units and from 0 to 50 mol percent of units of one or more comonomers copolymerizable with acrylonitrile into nitric acid-soluble copolymers is introduced into an aqueous nitrate coagulating bath for wet spinning the solution into a filament material, the bath containing a constant surplus of neutralizing agents in an amount ranging from about 0.05 to about 5% by weight being sufficient to convert all of the nitric acid introduced by the solution and to make the filament leaving the coagulating bath free of nitric acid. The nitrate concentration of the coagulating bath is maintained substantially constant during the wet spinning process by withdrawing a part of the bath in equimolar amounts to that of the nitric acid introduced by the polymer or copolymer solution and by adding neutralizing agents to the bath at a rate at which the nitric acid is introduced into the bath by the solution. Water which may be lost during the process may be replaced. The withdrawn filament material is washed, stretched, heat stabilized and dried in conventional manner while the withdrawn portion of the bath is treated to recover in solid form substantially all of the nitrates found therein.

BRIEF DESCRIPTION OF THE DRAWING

In the attached drawing an exemplary form of apparatus for the simultaneous production of filament material and of nitrates, in accordance with the present invention, is schematically shown.

STATEMENT OF THE INVENTION

Figure 1:
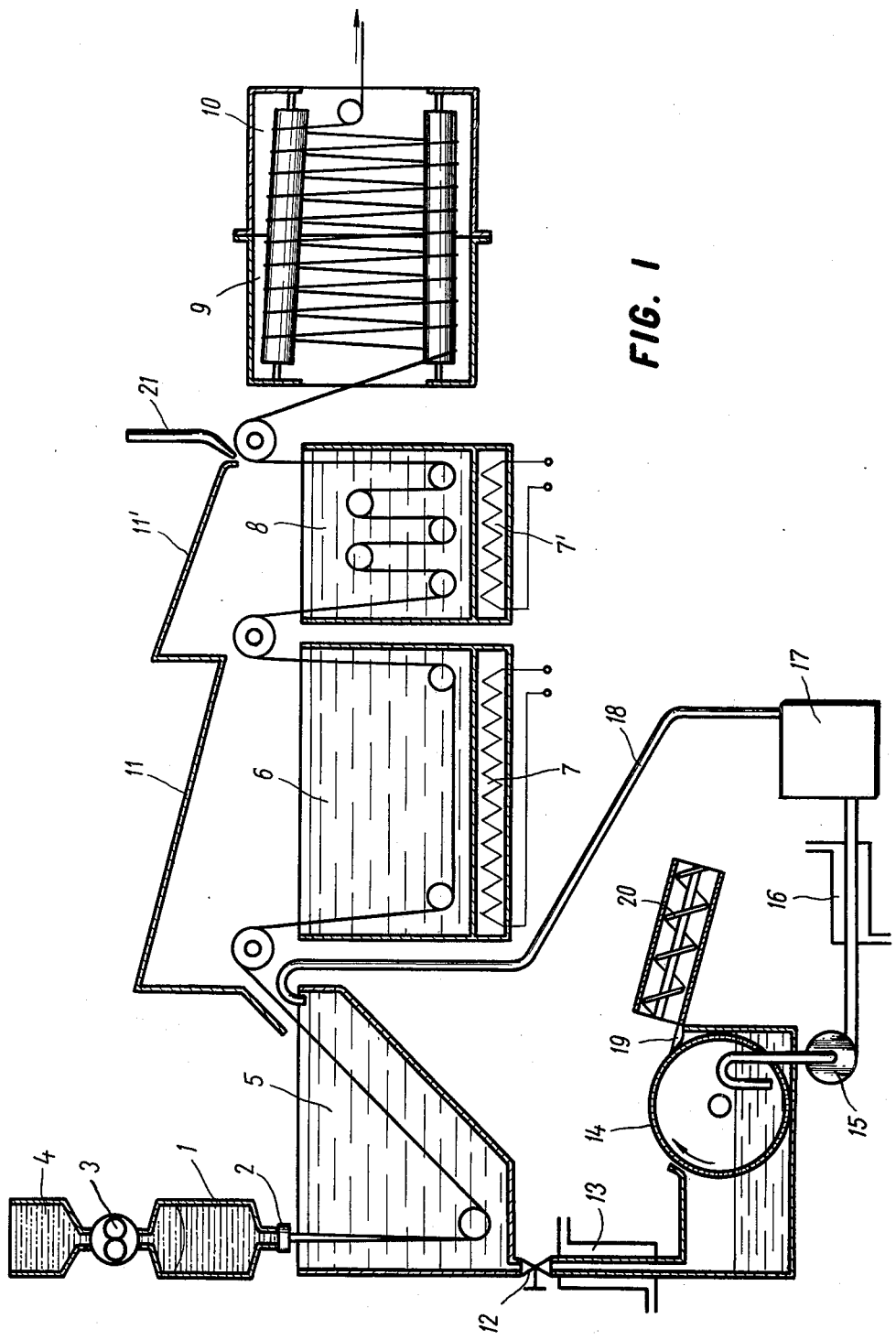

According to the present method of manufacturing acrylic fibres and filaments by wet spinning of nitric acid solutions of acrylic polymers and copolymers in an aqueous coagulating bath it is provided where a comparatively high concentration of the nitrates to be recovered as a by-product is constantly maintained in the coagulating liquid. The respective base or neutralizing agent for converting the nitric acid into nitrates is present in the coagulating system in an amount sufficient to neutralize substantially all the nitric acid introduced by the spinning solution and to make the filaments leaving the bath substantially free of nitric acid. Preferably an amount of neutralizing agent ranging from about 0.05 to about 5% by weight is employed.

The coagulating bath liquid is arranged so that it circulates inside the coagulating system as a whole and a part of the nitrate is separated as for example by cooling the liquid to precipitate crystals and then removing the precipitated crystals, or by evaporating the water leaving the nitrates. The required amount of the base or neutralizing agent is added to the coagulating liquid and the concentration and composition of the coagulating liquid is kept constant during the entire spinning process. The fibre which is withdrawn from the bath is washed, stretched, heat stabilized and dried in the usual manner and in any desired sequence of operation. The water losses are compensated for by replacing the same. In a system, shown in the drawing wherein several stages of wash water are employeed a part of the wash water can be recycled into the coagulating system if necessary. A part of the nitrates or the whole of them may be recovered from the coagulating system by evaporating the water and utilizing the condensed vapors for finishing the wash.

Replacement water may be introduced also with the nitric acid. Furthermore water is also formed by the neutralization process. The volume, or level of the coagulating bath and wash water is easily maintained in the apparatus schematically shown in the drawing by using suitable overflow valves and similar devices. The addition of the base or the neutralizing agent at the rate at which the nitric acid is introduced within the spinning solution can also be controlled by use of known apparatus such as refractometers, or by apparatus measuring the density of the bath at a constant temperature or by measuring the pH value of the bath. By this direct control, the composition of the coagulating bath may be continuously or intermittently corrected. It is sufficient only to keep constant the content either of the nitrates or of the neutralizing agent and the temperature and to control thereby the addition of the neutralizing agent.

The neutralizing agent (such as a salt of a weak acid) may be added in various ways, for example by admixing it to that part of the first washing bath with which the level of the coagulating (spinning) bath and simultaneously the concentration are kept constant. this is suitable if a part of the spinning bath is withdrawn and worked to nitrate and condensed water is used as a replacement therein. If however the nitrate is recovered by cooling the withdrawn part of the spinning bath and the crystals separated, the neutralizing agent can be admixed with the mother liquid remaining after the separation of the crystals which mother liquid may be recycled to the coagulating bath. Such alternate possibilities are obvious from the apparatus schematically shown in the drawing and further description is not necessary. Another possibility however, is to dissolve or disperse a solid neutralizing agent directly in the spinning bath. In this procedure however the metering of the amount would be difficult although not too burdensome.

The temperature of the coagulating system is kept as high as possible with respect to the coagulation properties of the acrylic polymer used. The concentrations of the nitrate is kept only slightly under the point of saturation to prevent crystalization on the fibre or in the parts of the coagulating system where the crystalization is not desired. Thereby, the recovery of the nitrate either by crystalization or by evaporation of water is made easy and economical. The maintenance of the bath below a saturation temperature is to prevent the growth of nitrates on the fibrous surface from an otherwise saturated solution. Since the saturation of various nitrates is different a reliable and easily controllable measure is to keep the temperature of the coagulation bath above the saturation point by at least 5° C. The highest temperature difference is, however, not critical being limited by economical aspects only and of course by the boiling point of the solution. The smaller the temperature difference between the saturation point and the actual service temperature of the coagulating bath, the easier will be the recovery of the nitrate. However some temperature interval must be maintained in order to avoid any undesirable crystalization on the filament or in the spinning bath which may inadvertently occur by sudden temperature drops. An accurate control therefor is to maintain the temperature at a 5° C difference.

The temperature of the stretch and wash liquids, subsequent to the coagulation bath, is to be kept between 70° C and the boiling point. Vapors liberated from the liquids are condensed and used for final washing, either in individual sectors of the system or at the end of an entire washing system. Thus the occurrence of waste water is either substantially reduced or fully avoided, the only products being fibres or filaments on the one hand and substantially dried crystalized nitrates on the other. Some water may be added if necessary into the last washing bath in order to compensate for losses. Further raw material in addition to the spinning solution, such as the respective base is introduced into the coagulating bath.

PREFERRED EMBODIMENT

Among acrylic polymers and copolymers, copolymers of acrylonitrile with a minor amount of hydrophilic comonomer such as acrylamide and/or acrylic acid are preferred. Solutions of polymers and copolymers containing up to 100% of acrylonitrile units as well as mixtures of polymers and copolymers having less than 100% of acrylonitrile units and from 0 to 50 mol percent of units of one or more comonomers copolymerizable with acrylonitrile into nitric acid soluble copolymers may also be used.

As a base for neutralizing the nitric acid, any suitable hydroxide, oxide, carbonate or its equivalent may be used, e.g. ammonium hydroxide, calcium carbonate, urea, guanidine, barium hydroxide, sodium carbonate, gaseous ammonia, sodium sulfate, potassium acetate, magnesium hydroxide, strontium carbonate, etc. It is one of the advantages of the present method that the same apparatus and process may be used for producing various nitrate forms. It is also possible to use mixtures of bases and various neutralizing agents to obtain mixed salts or salt mixtures, especially non-explosive salts and mixtures containing various cations, e.g. mixed sodium-calcium nitrates, urea, calcium-potassium nitrates, ammonium-calcium nitrates, etc., all useful as fertilizers.

Another advantage of the present method is the use of a closed system eliminating dilute waste water. The comparatively high temperature of all liquids used enhances the efficiency of washing and provides for sufficient amounts of condensed water for final washing. Nitrates may be recovered from the coagulating system either by cooling and crystalizing, or by evaporating and crystalizing, or also by simple evaporation until the same are dried or by a combination of both measures, and are separated by the conventional manner that is by filtration, centrifugation or similar processes.

It has been surprisingly found that in a highly concentrated warm or even hot nitrate solution the base, even when in the form of a hydroxide, does not prevent the formation of good, stretchable colorless gel fibres. The neutralization is complete even if the surplus of the base or neutralizing agent in the coagulating liquid is small. Preferably, the mother liquid, recycled after removing a part of the nitrates from the coagulating liquid and adding fresh base, is led into the spinning bath near the place where the coagulating fibre leaves it. This facilitates the thorough removal of the nitric acid from the filament.

Comparatively high temperatures in the coagulating system enable the recovery of the remainder of the monomers, particularly acrylonitrile, if the polymerization was carried out in nitric acid. Furthermore, the cooling of the circulating coagulating bath liquid may be carried out by means of the introduction of service water at ambient temperature, without expensive low temperature cooling apparatus.

Increased temperatures, up to the boiling point, are advantageous not only because the recovery of solid nitrates is made easier, but also because a sufficient amount of pure condensed water is obtained for final washing, so that the addition of outside water is confined to the replacement thereof is compensation for losses from the system. Because of this the system as a whole is closed and the production and occurrence of waste water may thus be eliminated. The process can be automated for any particular nitrate or mixture of nitrates by adjusting optimum conditions of concentration, temperature, withdrawal velocity, etc. The limits within which these conditions may be varied are sufficiently broad so that even pure polyacrylonitrile fibres may be produced in this way, although copolymers of acrylonitrile with a minor amount of other monomers such as acrylamide, methacrylamide, vinylpyridine, methacryic acid, acrylic acid, methacrylonitrile, ethylene sulfonic acid and its soluble salts, etc. are preferred. Also very suitable are block-copolymers obtained by polymerization of acrylonitrile in nitric acid and subsequent hydrolysis in the homogeneous acid solutions thus obtained, as described in the co-pending patent application Ser. No. 263,534 filed June 16, 1972 (Czechoslovak patent application PV4608-71).

The heat removed from the coagulating system by cooling the recycled part of the liquid is at least partly counterbalanced by the heat of neutralization so that the amount of energy needed to keep the temperature of the coagulating bath liquid at a constant level is low. It is even possible to adjust the conditions of the wet spinning so that the coagulating bath liquid need not be externally heated at all. The amount of the added base as well as the amount of nitrate removed from the system have to be equimolar with the amount of the introduced nitric acid. Simultaneously, the amount of water is to be kept at a constant level. Current flow control appliances and systems make it possible to keep the spinning conditions within very narrow limits.

In order to avoid precipitation of nitrate crystals on the fibre or filament in the coagulatng liquid the concentration and temperature thereof are chosen within the region above the values at which the nitrate begins to separate. Although this range may be rather broad, involving all unsaturated liquid solutions, it is limited in practice by two obvious requirements: the nitrate concentration must not be too low, since otherwise the rate of coagulation would be too high and the fibre would be heterogeneous, and furthermore the nitrate concentration has to be high enough to secure easy crystalization by cooling and economical evaporation of water if necessary. As a rule, the initial coagulating liquid is made by preparing a saturated nitrate solution at a temperature which is at least about 5° C lower than the service temperature during the wet spinning, by adding the base for neutralization and by thereafter heating the solution to the service temperature. Thus the temperature of the coagulating bath, in service is at least 5° greater than the temperature at which the nitrate solution, (at the same concentration) prior to the addition of the base, would be saturated. While the difference between the saturation and service temperatures, at the highest range is not critical the most appropriate difference however depends upon the nitrate to be obtained and the other spinning conditions. Most often a difference of from 7 to 15° C is suitable.

In addition to providing a system for separating the nitrate, it may be advantageous to provide a system for the recovery of volatile impurities, particularly acrylonitrile, if the polymerization was carried out directly in the nitric acid used. The separation of volatile impurities may be enhanced by decreasing the pressure, by increasing the temperature or by bubbling an inert gas through the recycled coagulating liquid. If a carbonate is used for neutralizing nitric acid, the liberated carbon dioxide strips volatile compounds which can then be separated from it by cooling or by sorption, if desired. Carbon dioxide thus obtained may be further utilized as inert gas for polymerization, heat fixation and drying. Since the purity of the coagulating liquid is more important than that of the nitrate, it may be advantageous to recover all the nitrates by evaporation of water only, without recycling the mother liquid after crystallization. Better still, a part of the nitrate may be separated in crystals by cooling with service water, the mother liquid being then converted to fertilizer by evaporating it into a dry state. Thereby, the accumulation of impurities in the coagulating liquid may be fully avoided.

The term "coagulating system" means not only the coagulating bath itself, but also the side system for the recovery of nitrates and volatile compounds, as well apparatus for separating the nitrates, adding bases and measuring and regulating devices and other instruments and accessories, necessary for carrying out the process.

The term "base" means any compound capable of neutralizing nitric acid in aqueous solutions particularly also metal salts of weak acids, soluble or insoluble in water.

The neutralization can be carried out at any point in the coagulating system, i.e. also in a separate system through which the coagulating liquid is pumped. In such system, an insoluble "base" in the above sense of the term may be stored in excess, preferably in granulated or pelleted form, or in large pieces. Small particles of the base are entrained into the coagulating liquid. In other words, the neutralization need not occur uniformly, the PH value of the coagulating liquid being sometimes different at different places of the coagulating system. Moreover, the "base" need not have alkaline reaction as defined by the pH value. A filter filled with such water insoluble "base", e.g. limestone, may be arranged also preceding the device for the recovery of the nitrate, to avoid the present free nitric acid in the nitrate.

As it is well known, the hygroscopicity of calcium nitrate-dihydrate is reduced if some pulverulent calcium carbonate covers the surface of the crystals. This effect is easily achieved in the present process when ground limestone is used as the "base" and suspended in an excess in the coagulating liquid. When recycling acid coagulating bath through a filter filled with a metal carbonate, the liberated gas can be utilized for pumping the coagulating liquid by means of so called "mamoth pump."

The apparatus for carrying out the method of the invention is preferably designed so that all important parameters can be adjusted within sufficiently broad limits so that various nitrates can be obtained as by-products in the same equipment. The most important parameters are temperature, concentration of chemicals, withdrawal velocity, total cross section of the spinnerette holes, concentration of the polymer in the spinning solution, titre of the thread or fibre bundle, stretching ratio, viscosity of the spinning solution, etc. The withdrawal velocity and the path length in the baths are chosen such that all nitric acid is neutralized and substantially all ions washed out before drying.

The sequence of the respective baths may be changed, if desired, so that the hot stretching bath may be arranged next to the coagulating bath, as shown in the accompanying drawing or between two washing baths, or also as the last bath before heat stabilization and drying.

The washing system can have several steps, the nitrate concentration in each step being also constant. If the titre and drawing off velocity exceed the capacity of the washing system, more fresh water is to be added and the corresponding part of the coagulating liquid or if desired, the first washing liquid, may be removed by overflow and worked by evaporating the excess of water. Since the condensed water is recycled to the end of the washing system, this measure is highly efficient.

The method of the present invention is suitable also for manufacturing curled or twisted bicomponent fibres and filaments, with either an immersed or non-immersed spinneret. To this purpose, two solutions of the same polymer, partly hydrolized at different temperatures may be used with advantage. It is of course, also possible to use two different copolymers, one containing for example ten percent sodium ethylene sulfonate and the other ten percent of ethyl acrylate, the remainder being acrylonitrile.

The method of the invention is illustrated by the following examples and the annexed schematic drawing. All percentages in the examples are by weight if not otherwise stated.

EXAMPLE I

A spinning solution was prepared by dissolving 160 grams of acrylonitrile (containing only 2.5% of water and no inhibitors of polymerization) in 835 grams of a 63% aqueous solution of colorless nitric acid. In this solution, 0.8 grams of urea and 1.5 ml of a 10 % aqueous solution of ammonium persulfate were dissolved. After a short period of deaeration in the vacuum of a water jet pump the solution was transferred into 200 ml pipettes and left standing, without access of oxygen and actinic light for 132 hours at 18° C. The clear viscous solution of the partly hydrolyzed polyacrylonitrile was extruded by means of a spinning pump 3, filled with paraffin oil 4 from the pipette 1 through the spineret 2 into the coagulating liquid 5. Between the spinneret and the coagulating liquid an air gap of 60 mm long existed. The coagulating solution consisted of a 28° C aqueous solution containing 220 gr of urea nitrate and 30 grams of free urea in 1000 ml. The coagulating system included furthermore the valve 12, cooler 13, drum filter 14, recirculating pump for mother liquid 15, heater 16, apparatus for adding urea 17, pipe 18, knife 19 and transporter of wet urea nitrate 20. The filament was drawn off at a rate of 30 m/minute and stretched in the hot washing bath 6, provided with a heater 7 at its bottom which was maintained at 98° to 99° C. The filament was stretched to 500% of its spun length. Water, condensed from the vapors in the inner surface of the roof 11 was led in part onto the fibre bundle leaving the stretching bath, and in part also onto the roller between the the coagulating system 5 and the stretching bath 6. The fibre bundle was then drawn off under tension through the wash system 8, also provided with a heater 7' at its bottom. The temperature of the wash system was the same as that of the stretching bath. Likewise the wash water vapors condensed on the interior surface of the cover 11' and the condensate was used for final washing and dilution of the washing liquid which was led in counterflow into the stretching bath and therefrom into the coagulating system. The fibre bundle was dried in a common chamber 9 and heat stabilized in chamber section 10 on a pair of rotating cylinders with non-parallel axes so that the fibre bundle was moved in a helical line through the chamber. The chamber was fed with hot carbon dioxide (initial temperature 150° C) in a counterflow direction. The diameter of each of the cylinders was slightly tapered toward their end so that the fibres could partly relax during the stabilization. The stretching ratio could be changed by changing the speed of revolution of the drawing off roller. Some details as for example the use of a driven screw in the cooler 13, preventing clogging by urea nitrate crystals, are not shown in the diagramatic drawing, but for those skilled in the art such techniques are obvious.

A part of urea nitrate equimolecular with the amount of article acid added was removed by the screw 20 from the coagulating system, the whole mother liquid being recycled after having added an equimolar amount of urea.

EXAMPLE II

Example I was repeated in the same equipment, except that the mother liquid was evaporated to a dry condition instead of being recycled. Water vapors thus obtained were condensed and fed into the washing system. As a result the production of the fibre in a given time unit could be increased accordingly. Crystaline urea nitrate could be utilized as such, the evaporated and dried mother liquid could be used as fertilizer. Fresh urea was added directly into the coagulating bath.

EXAMPLE III

The spinning solution according to claim 1 was spun into a coagulating liquid prepared by saturating water with ammonium nitrate at 35° C, increasing its temperature to 45° C and adding 2% by volume of concentrated aqueous ammonium. The recycled part of the coagulating liquid was cooled to plus 15° C, the precipitated crystaline ammonium nitrate separated and gaseous ammonia was led into the coagulating liquid in an amount equimolecular to the nitric acid of the spun solution. The amount of water introduced into the coagulating system with the spinning solution and formed by neutralization was approximately equal to that carried away with the fibre bundle and wet ammonium nitrate so that the level and concentration of the coagulating liquid remained almost constant for a long time without further regulation.

EXAMPLE IV

A copolymer of acrylonitrile with acrylamide was prepared by polymerizing 5 parts by weight of acrylonitrile with two parts of acrylamide in 93 parts of oxygen free water, using a redox initiator consisting of equal parts of potassium metabisulfite and ammonium persulfate (0.1% by weight of the monomer mixture each). The precipitated copolymer was filtered off, washed with hot water and dried at 40° C under reduced pressure. The powdered copolymer was dissolved, while stirring, in a 70% aqueous solution of colorless nitric acid, to which 0.5% of urea was previously added, so as to obtain a 10% aqueous solution. The viscous solution was deaerated and spun, using the apparatus described in Example I. The coagulating bath liquid consisted of aqueous potassium nitrate solution saturated at 24° C, and heated to 30° C. The solution was then alkalinized with 1% of solid potassium hydroxide to a pH between 11 and 12. Further treatment was the same as in Example I. The by-product, crystalize potassium nitrate, contained only traces of free alkali.

EXAMPLE V

The spinning solution was prepared according to Example I except that the spinning pipettes had 1 mm nozzles and the solution was kept therein at plus 13° C for 144 hours. The surface of the polymerizing solution was covered with a layer of white paraffin oil to keep oxygen off. As the coagulating liquid, a calcium nitrate solution, saturated at 20° C and then heated to 48° to 50° C was used, in which a suspension of precipitated calcium carbonate was held in an excess to that of the nitric acid introduced with a spun solution. A thick suspension of calcium carbonate was prepared using part of wash water from the first bath as a medium and stirred into the coagulating liquid. Calcium nitrate - dihydrate crystals contained on their surface pulverized calcium carbonate which reduced the hygroscopicity. The cooling and crystalization away carried out continuously in such a way that some crystals were always present in the crystalization zone. At a withdrawal velocity of 18 m/minute a strong translucent gel-like fibre was obtained which, after stretching in the ratio of 1 to 5.8, drying under tension and heat stabilization under carbon dioxide at 170° C with 15% relaxation, had a tensile strength of 5 grams/den, breaking elongation 27% and equilibrium sorption in water 8.5% per weight. After 10 minutes in water at 95° C, the fibre shrunk less than 5% of its dried length. When the level of the coagulating bath rose, the overflow was converted by evaporation into fertilizer.

EXAMPLE VI

A copolymer prepared by precipitation-copolymerization of 95 parts of acrylonitrile with 5 parts of n-butyl acrylate in water, using a redox initiator, was sucked off, washed, vacuum dried at 40° C and pulverized. 15 parts of the copolymer were dissolved at 35° C while stirring in 85 parts of a 65% aqueous solution of coloress nitric acid, containing 0.5 parts of urea. The homogenized solution was spun into a coagulating liquid, prepared by saturating water with calcium nitrate at 30° C and then increasing the temperature to 60° C. The coagulation liquid was recycled through a filter filled with comminuted limestone having a grain size more than 1 mm and provided with a venting valve. From the filter the neutralized solution was led through a cool crystallization zone, through a continuously working centrifuge and back into the coagulating bath. On the bottom of the stretching and washing bath a layer of granulated marble was kept to neutralize a small amount of the acid stripped by the fibre bundle from the coagulating bath. From the washing and stretching bath the liquid overflowed in counterflow into the coagulating bath.

Similar results were obtained with coagulating solutions containing sodium nitrate with added sodium hydrocarbonate, barium nitrate with barium hydroxide, guanidine nitrate with guanidine and others. Instead of the exemplified acrylonitrile — acrylamide copolymers, copolymers of acrylonitrile with a minor amount of vinyl pyridine, methacrylamide, sodium ethylene sulfonate, metharyrlonitrile, acrylic acid, alkyl acrylates and alkyl methacrylates with $C_1$ to $C_4$ alkyls, glycol acrylates and glycol methacrylates, styrene and other monomers capable of copolymerizing with acrylonitrile, dissolved in nitric acid having a concentration of about 50 to about 72% can also be employed. Preferably from 1 to 50 mol percent of units of one or more comonomers may be used. The equilibrium sorption of water of the oriented, dried and heat stabilized fibre lay usually between one and 20 percent. Less viscous solutions, i.e. either less concentrated or lower molecular weight polymer solutions in nitric acid, could be easily spun also from spinnerets fully immersed in the coagulating bath.

What is claimed is:

1. A method of simultaneously producing (1) acrylic filament material by wet spinning nitric acid solutions of acrylic polymers and (2) nitrates from the coagulating bath system, comprising providing a solution of polymers or copolymers containing up to 100% of acrylonitrile units and from 0 to 50 mol percent of units of one or more comonomers copolymerizable with acrylonitrile into nitric acid-soluble polymers, introducing said solution into a coagulating bath for wet spinning said solutions into filament material and withdrawing said filament material from said bath, said coagulating bath containing an aqueous solution of nitrates and a constant surplus of neutralizing agents in an amount ranging from about 0.5 to about 5% by weight and sufficient to convert the nitric acid introduced by said polymer solution into nitrates and to make the filament leaving the the coagulating bath free of nitric acid, maintaining the temperature of the coagulating bath at least about 5 degrees above the temperature at which the solution of the same concentration is saturated with respect to its nitrate content, maintaining the nitrate concentration of the coagulating bath substantially constant during wet spinning by (a) withdrawing a part of said bath equimolar to the amount of nitric acid introduced therein by the wet spinning of said polymer solution, (b) adding a neutralizing agent to said bath at a rate at which nitric acid is introduced into said bath by said polymer solution, and (c) replacing the water lost from said bath, treating said withdrawn part of said bath to recover in solid form at least part of the nitrate found therein and washing, stretching, heat stabilizing and drying said withdrawn filament material.

2. The method according to claim 1 wherein the water added to said bath and said neutralizing agent added to said bath are admixed together prior to such addition.

3. The method according to claim 1 wherein the water added to said bath is recovered from said withdrawn portion after said nitrates are recovered.

4. The method according to claim 1 wherein the temperature at which said stretching and washing are carried out is between about 70° C and about the boiling point of the water.

5. The method according to claim 1 wherein a nitric acid solution of a copolymer of acrylonitrile and acrylamide is provided.

6. The method according to claim 1 wherein calcium carbonate is employed as the neutralizing agent.

7. The method according to claim wherein the coagulating bath passes through a filter containing said neutralizing agent and whereby carbon dioxide is liberated and is utilized as an inert gas in the method.

8. The method according to claim 1 wherein the washing, stretching, heat stabilizing and drying is carried out in counterflow to the wet spinning.

9. The method according to claim 1 wherein any water of evaporation is condensed and recycled into said system.

10. The method according to claim 1 including the step of maintaining the coagulating bath with a basic pH.

* * * * *